(12) United States Patent
Yao et al.

(10) Patent No.: US 7,576,885 B2
(45) Date of Patent: Aug. 18, 2009

(54) BALANCING GRAYS ON COLOR PRINTERS

(75) Inventors: Meng Yao, West Linn, OR (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1131 days.

(21) Appl. No.: 10/270,966

(22) Filed: Oct. 15, 2002

(65) Prior Publication Data
US 2004/0070775 A1  Apr. 15, 2004

(51) Int. Cl.
*G06F 15/00* (2006.01)
(52) U.S. Cl. .................. 358/1.9; 358/504; 358/518; 358/525; 358/529
(58) Field of Classification Search .............. 358/1.9
See application file for complete search history.

(56) References Cited

U.S. PATENT DOCUMENTS

| | | | |
|---|---|---|---|
| 4,482,917 A | 11/1984 | Gaulke et al. | |
| 5,305,119 A | 4/1994 | Rolleston et al. | 358/522 |
| 5,323,241 A | 6/1994 | Yonezawa | |
| 5,528,386 A | 6/1996 | Rolleston et al. | 358/522 |
| 5,604,567 A * | 2/1997 | Dundas et al. | 399/39 |
| 5,710,824 A * | 1/1998 | Mongeon | 382/162 |
| 5,929,874 A * | 7/1999 | Barton et al. | 347/15 |
| 6,191,874 B1 * | 2/2001 | Yamada et al. | 358/529 |
| 6,480,299 B1 | 11/2002 | Drakopoulos et al. | |
| 6,607,258 B2 | 8/2003 | Jodra et al. | |
| 7,027,185 B2 | 4/2006 | Subirada et al. | |
| 7,088,470 B2 | 8/2006 | Lammens et al. | |
| 7,190,487 B2 | 3/2007 | Dalrymple et al. | |
| 2005/0062985 A1 | 3/2005 | Lammens et al. | |
| 2005/0083540 A1* | 4/2005 | Hersch et al. | 358/1.9 |

FOREIGN PATENT DOCUMENTS

EP  1398956 A1 *  3/2004
JP  10-200765  7/1998

* cited by examiner

*Primary Examiner*—David K. Moore
*Assistant Examiner*—Benjamin O Dulaney
(74) *Attorney, Agent, or Firm*—Manuel Quiogue

(57) ABSTRACT

A gray balancing technique wherein color data values are modified only if the color data values include a gray component.

3 Claims, 3 Drawing Sheets

BALANCING GRAYS ON COLOR PRINTERS

BACKGROUND OF THE DISCLOSURE

Color printers typically employ a plurality of inks of different primary colors to generate a spectrum of colors. For example, many color printers use four ink colors: cyan (C), magenta (M), yellow (Y) and black (K). Color images are formed on a receiving substrate or medium by placing combinations of zero or more dots of C, M, Y or K ink at each pixel location. Cyan, magenta and yellow are typically employed since a wide range of colors can be produced by different combinations of these inks.

Ideally, equal amounts of C, M and Y inks should result in a gray color. However, due to a variety of factors, equal amounts of C, M and Y commonly does not produce gray colors, and printers are commonly configured to perform gray balancing. For example, gray balancing can involve adjusting the amounts of C, M, and/or Y so that when the input color data contains equal amounts of CMY, the printed output is gray or substantially corresponds to a black output of the same density. Gray balancing can be difficult to achieve.

DETAILED DESCRIPTION OF THE DISCLOSURE

Figure 1:
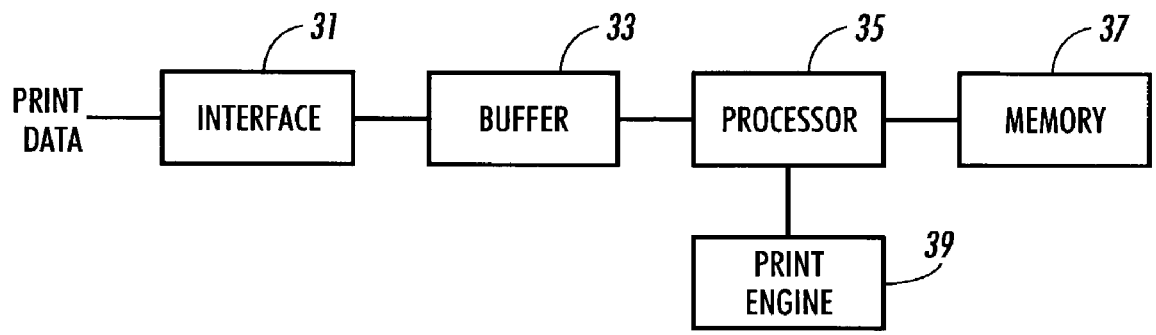
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example.

Figure 2:
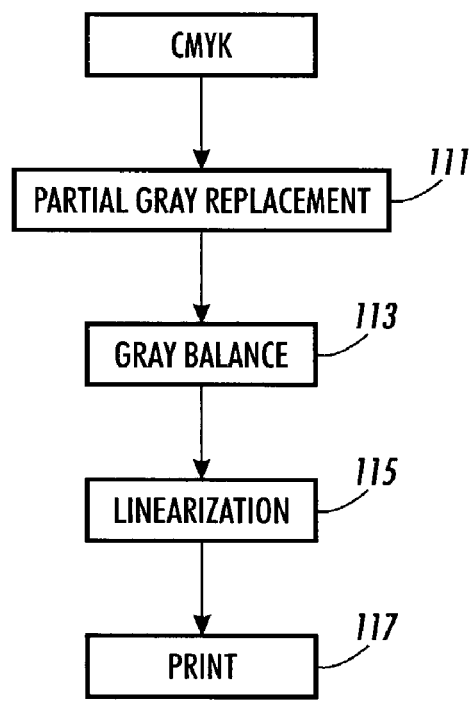
FIG. 2 is a schematic diagram of an embodiment of an image processing pipeline.

FIG. 2 is a block diagram of an embodiment of a portion of an image processing pipeline for a color printer. At 111 partial gray replacement is performed on input primary color data such as CMYK (cyan, magenta, yellow, black), wherein some amounts of CMY are replaced with black. At 113 gray balancing is performed. At 115 linearization is performed so that substantially equal changes in C, M or Y tends to produce substantially equal changes in visual perception, for example. At 117 half-toning is performed, and at 117 printing takes place.

Figure 3:
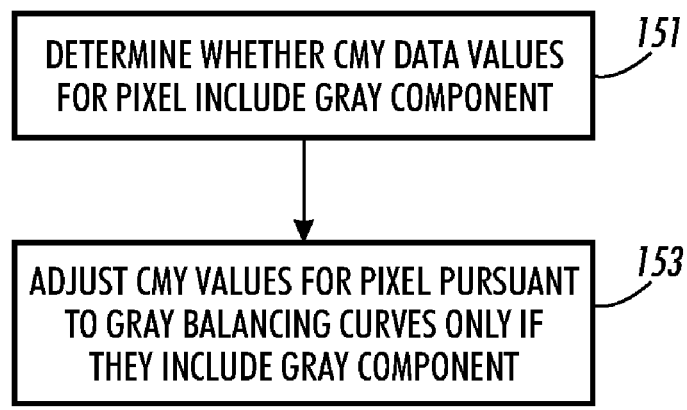
FIG. 3 is a schematic flow diagram of an embodiment of a gray balancing procedure.

FIG. 3 is a schematic flow diagram of an embodiment of a procedure for gray balancing non-black primary color data such as CMY data for a pixel of an image, and can be employed to gray balance some or all of the pixels of an image, as desired.

At 151 a determination is made as to whether the CMY data values for a pixel include a gray component. The CMY data values for a pixel contain a gray component if all of the CMY data values for a pixel are non-zero. The gray component can comprise for example the minimum of the C, M and Y data values. At 153 the CMY data values for a pixel are adjusted pursuant to gray balancing curves only if they include a gray component.

Figure 4:
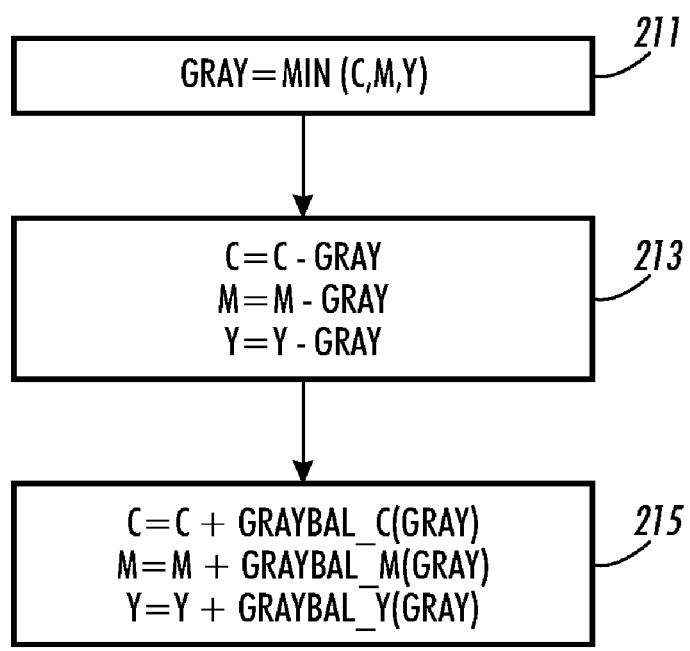
FIG. 4 is a schematic flow diagram of an embodiment of another gray balancing procedure.

FIG. 4 is a schematic flow diagram of an embodiment of a procedure for gray balancing non-black primary color data such as CMY data for a pixel of an image, and can be employed to gray balance some or all of the pixels of an image, as desired.

At 211 a GRAY component is set to the minimum of the original or input C, M and Y data values for a pixel. At 213 the GRAY component is subtracted from the input CMY data values to arrive at CMY color component values. At 215 gray-balanced CMY values GRAYBAL_C(GRAY), GRAYBAL_M(GRAY) and GRAYBAL_Y(GRAY) are added to the CMY color component values to obtain gray balanced output CMY values. The gray-balanced CMY values GRAYBAL_C(GRAY), GRAYBAL_M(GRAY) and GRAYBAL_Y(GRAY) are obtained from gray balancing curves that can be implemented as a look-up table that is indexed by the GRAY component value, for example. The gray balancing curves are configured such that GRAYBAL_C(GRAY), GRAYBAL_M(GRAY) and GRAYBAL_Y(GRAY) are all zero for the argument GRAY being equal to zero. Each pixel of an image can be processed in accordance with the foregoing, but the CMY values are adjusted only if there is a gray component (i.e., all of the CMY values are non-zero). In other words, if at least one of the CMY data values of a pixel is zero, such CMY data values are not adjusted.

The gray balancing curves can be arrived at empirically by printing a plurality of color samples or patches, and then selecting gray patches from the printed color patches, for example by initial visual sorting and then electro-optical measurement. A curve fitting procedure is then performed on the CMY values of the selected gray patches to approximate the ink combinations needed to obtain grays of different densities.

The gray balancing curves can also be arrived at empirically by printing a plurality of color patches or samples that encompass predetermined gray targets, and measuring the color of the color samples to obtain their colorimetric values. The color samples can include non-neutral colors, and preferably define a volume that surrounds or encompasses the predetermined gray targets. The CMY values of the color samples are then interpolated in a color space such as L*a*b, for example using tetrahedral interpolation, to determine discrete CMY combinations that substantially match the predetermined gray targets. Curve fitting can then be performed on the discrete CMY combinations to arrive at the gray balancing curves.

Tetrahedral interpolation can be accomplished for example by employing Delauney tessellation to tessellate the space covered by the color sample colorimetric data values. Delauney tessellation fills that space with non-overlapping tetrahedra. To obtain the CMY combinations that produces a targeted gray (expressed for example in L*a*b values), the tetrahedron that encompasses the gray target is first located, and barycentric weights are calculated and applied to the four vertices of the tetrahedron to obtain the CMY values for the gray target. For tetrahedral interpolation, the color samples can be selected such that the predetermined gray targets are encompassed by the space defined by the tetrahedra employed for tetrahedral interpolation.

The predetermined gray targets can comprise colors with a*=0 and b*=0, or they can be colors that substantially match the colorimetric values of different amounts of black, for example.

By way of illustrative example, the following c code can be employed to generate color samples that encompass gray targets that can comprise for example colors with a*=0 and b*=0:

```
for(c = 0.0; c < 1.0; c +=0.07) {
    for(m = 0.0; m < 1.0; m+=0.07) {
        for(y = 0.0; y < 1.0; y += 0.07) {
            gray = min(c, min(m,y));
            if(c - gray < 0.15 && m - gray < 0.15 && y -
            gray < 0.15)
                printf("%2.4f %2.4f %2.4f %2.4f\n",
                c, m, y, 0.0);
        }
    }
}
```

The foregoing loops through CMY combinations in 7% steps and finds those color values that are within 15% (in absolute terms) of the gray component which is the minimum of the C, M and Y values of each CMY combination. Min(x, y) is macro that returns the minimum of x and y, and thus min(c, min(m,y) gives the minimum of C, M and Y. This code generates CMY data values for printing 255 color samples around and on an axis defined by the gray components. Stated another way, the procedure prints only color samples that are within a selected percentage of selected colors having equal amounts of C, M and Y. It should be appreciated that other distances from colors of equal amounts of C, M and Y can be employed, for example to insure that the printed color samples encompass the predetermined gray targets. By way of specific examples, color values within 10% or 20% of the colors having equal amounts C, M and Y can be printed. It should also be appreciated that the step size can be selected pursuant to various considerations including for example the desired accuracy and/or the desired number of samples. The printed color samples are then measured to produce colorimetric data which can be used to tetrahedrally interpolate the CMY data values to determine discrete CMY combinations that substantially match a range of neutral targets. Curve fitting can then be performed on the discrete CMY combinations to arrive at the gray balancing curves.

The gray balancing curves can be configured to track the density characteristic of the black ink used by the printer, for example.

Figure 5:
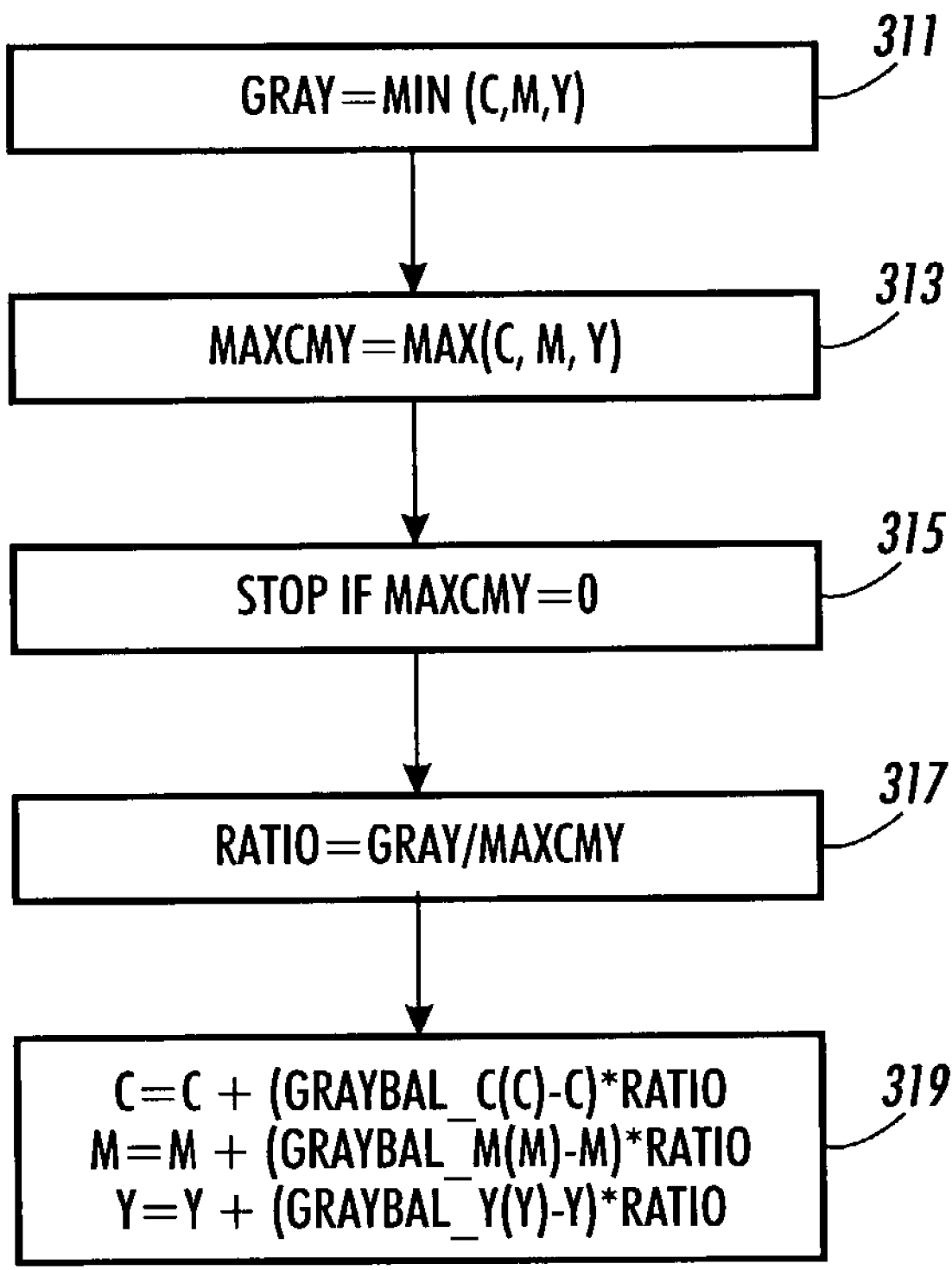
FIG. 5 is a schematic flow diagram of an embodiment of a further gray balancing procedure.

FIG. 5 is a schematic flow diagram of an embodiment of another procedure for gray balancing non-black primary color data such as CMY data for a pixel of an image, and can be employed to gray balance some or all of the pixels of an image, as desired.

At 311 a GRAY component is set to the minimum of the original or input C, M and Y data values for a pixel. At 313 MAXCMY is set to the maximum of the input C, M and Y data values for a pixel. At 315 the procedure is stopped if the maximum MAXCMY of the C, M and Y values is zero (i.e., if all of the C, M and Y values are zero), and the CMY data values for this pixel are not adjusted. At 317 a RATIO of the GRAY component to MAXCMY is calculated. At 319 gray balanced output CMY data values are calculated by adding to each of the original CMY values a product of: (1) the difference between the corresponding balanced gray values GRAYBAL_C(C), GRAYBAL_M(M) and GRAYBAL_Y(Y), and the original C, M and Y values, and (2) the RATIO calculated previously. The gray balanced values GRAYBAL_C(C), GRAYBAL_M(M) and GRAYBAL_Y(Y) are obtained from gray balancing curves that can be determined as discussed previously relative to the procedure of FIG. 4. In this case, however, the independent variables are the respective C, M and Y values.

In the foregoing, the amount of gray balancing that is performed increases with the relative amount of gray that is contained in the original input CMY data. In other words, the amount of gray balancing is a function of the relative amount of gray in the input CMY data, and less gray results in less gray balancing. Thus, if the original values of C, M and Y are all non-zero and equal (i.e., gray), RATIO is 1 and full gray balancing is performed. If at least one of the original values of C, M and Y is zero (i.e., the gray component is zero), RATIO is zero and no gray balancing is performed.

The invention has been described with reference to disclosed embodiments, and it will be appreciated that variations and modifications can be affected within the spirit and scope of the invention.

What is claimed is:

1. A method of gray balancing comprising:
   determining whether CMY data values for a pixel includes a gray component;
   modifying with a processor the CMY data values only if the CMY data values include a gray component; wherein modifying the CMY data values comprises:
   determining a gray component of the CMY data values using:

GRAY=MIN(C, M, Y)

wherein MIN(C, M, Y) is a minimum of C, M and Y; and modifying each of the CMY data values using:

C=C+(GRAYBAL_C(C)—C)*RATIO

M=M+(GRAYBAL_M(M)—M)*RATIO

Y=Y+(GRAYBAL_Y(Y)—Y)*RATIO wherein GRAYBAL_C(C), GRAYBAL_M(M), and GRAYBAL_Y(Y) are gray balancing curves, and RATIO is a ratio between GRAY and a maximum of the original values of C, M and Y.

2. A method of gray balancing primary color data values for a pixel, wherein the primary color data values include a value for each of a plurality of primary colors, comprising:
   determining whether primary color data values for a pixel includes a gray component;
   modifying with a processor the primary color data values only if the primary color data values include a gray component, wherein modifying the primary color data values comprises:
   defining a gray component of the primary color data values as a minimum of the primary color data values; and
   for each primary color, modifying a primary color data value by adding to the original primary color data value a product of (1) a difference between a balanced gray value for the primary color data value and the original primary color data value, and (2) a ratio between the gray component and a maximum of the original values of the primary color data values.

3. A method of gray balancing comprising:
   determining a gray component in CMY data values for a pixel using:

GRAY=MIN(C, M, Y)

wherein MIN(C, M, Y) is a minimum of the C MY data values;
   determining a relative amount of gray in the CMY data values; and modifying with a processor each of the CMY data values using:

$$C = C + (GRAYBAL\_C(C) - C) * RATIO$$

$$M = M + (GRAYBAL\_M(M) - M) * RATIO$$

$$Y = Y + (GRAYBAL\_Y(Y) - Y) * RATIO$$

wherein GRAYBAL_C(C), GRAYBAL_M(M), and GRAYBAL_Y(Y) are gray balanced values, and RATIO is the ratio between GRAY and a maximum of the initial values of C, M and Y.

* * * * *